United States Patent [19]

Queneau et al.

[11] 4,342,728

[45] Aug. 3, 1982

[54] PROCESS FOR DIGESTING TUNGSTEN ORES CONTAINING ORGANIC MATTER

[75] Inventors: Paul B. Queneau, Golden; Leo W. Beckstead; Robert F. Hogsett, both of Arvada, all of Colo.

[73] Assignee: AMAX Inc., Greenwich, Conn.

[21] Appl. No.: 225,904

[22] Filed: Jan. 19, 1981

[51] Int. Cl.[3] .......... C01G 41/00

[52] U.S. Cl. .......... 423/61; 423/53; 423/58

[58] Field of Search .......... 423/53, 61; 75/1, 97 R

[56] References Cited

U.S. PATENT DOCUMENTS

| | | | |
|---|---|---|---|
| 2,187,750 | 1/1940 | Maruin | 423/61 |
| 2,351,678 | 6/1944 | Hall | 423/58 |
| 3,429,693 | 2/1969 | Bauer et al. | 423/61 |
| 3,656,888 | 4/1972 | Barry et al. | 423/600 |
| 3,714,325 | 1/1973 | Bloom et al. | 423/53 |
| 4,165,362 | 8/1979 | Reynolds | 423/53 |
| 4,167,555 | 9/1979 | Gomes et al. | 423/61 |

FOREIGN PATENT DOCUMENTS

| | | | |
|---|---|---|---|
| 459554 | 1/1937 | United Kingdom | 423/53 |
| 290939 | 2/1971 | U.S.S.R. | 423/53 |

OTHER PUBLICATIONS

Yih et al, "Tungsten", Plenum Press, New York, 1979, pp. 82–83.

*Primary Examiner*—Herbert T. Carter
*Attorney, Agent, or Firm*—Michael A. Ciomek

[57] ABSTRACT

Oxide ores or ore concentrates containing organic matter are slurried with water and heated to a temperature of at least about 230° C. under an oxygen partial pressure of at least about 25 psi to oxidize the organic matter. Advantageously, the process in accordance with the present invention can be used in the treatment of tungsten concentrates and can be employed while the tungsten concentrates are being digested with sodium carbonate or sodium hydroxide solutions.

10 Claims, No Drawings

PROCESS FOR DIGESTING TUNGSTEN ORES CONTAINING ORGANIC MATTER

FIELD OF THE INVENTION

The present invention relates to the treatment of oxide ores and oxide ore concentrates and, more particularly, to the wet oxidation of oxide ores and oxide concentrates.

BACKGROUND OF THE INVENTION

The process in accordance with the present invention can be used to condition oxide ore or concentrates containing substantial amounts of carbonaceous matter which can also contain sulfides such as iron sulfide. However, in order to facilitate the description of the present invention, the invention will be described in terms of treatment of tungsten concentrates, particularly scheelite concentrates.

Frequently, organic matter is associated with oxide concentrates. The concentrate can contain substantial amount of flotation reagents in addition to sulfides, such as pyrrhotite, pyrite or chalcopyrite. Natural organic matter, such as humus can also be present. The presence of organic matter, particularly flotation reagents, can interfere with subsequent hydrometallurgical processing. For example, the presence of flotation reagents can cause substantial foaming during hydrometallurgical processing. Foaming can lower the capacity of the processing vessels, or can cause hazardous conditions by overflowing such vessels. If the flotation reagents are carried on to subsequent process steps, such as solvent extraction, the flotation reagents can contaminate the organic phase causing substantial processing inefficiencies and often requiring periodic replacement of the organic extractant. In the processing of tungsten concentrates which contain significant amounts of molybdenum the presence of flotation reagents or other organic matter can reduce the effectiveness of the molybdenum removal operation. The presence of sulfides can create unpleasant or unsafe working conditions if during a subsequent process hydrogen sulfide is evolved.

BRIEF DESCRIPTION OF THE INVENTION

Generally speaking, the present invention relates to a process for conditioning an oxide ore or concentrate containing carbonaceous material. A slurry of the oxide material and water is established in an autoclave, and the slurry is heated to a temperature of at least about 230° C. under an oxygen partial pressure of at least about 25 pounds per square inch (psi) to oxidize substantially all the carbon in the material to carbon dioxide.

In an advantageous embodiment of the present invention, organic matter and sulfides associated with scheelite concentrates are oxidized during digestion of the scheelite concentrates with sodium carbonate solutions. A slurry of scheelite concentrate in an aqueous sodium carbonate solution of an initial concentration ranging from about 50 grams per liter (gpl) to about 200 gpl at a $Na_2CO_3$:$WO_3$ weight ratio of between about 0.9 to about 1.6 or even higher is established in an autoclave. The slurry is then heated to a temperature between about 230° C. and about 320° C. under an oxygen partial pressure of at least about 25 psi to digest the tungsten values content in the concentrate and to oxidize any organic matter and sulfides.

DETAILED DESCRIPTION OF THE INVENTION

Scheelite concentrates which can be treated by the process in accordance with the present invention, can be obtained by conventional flotation and gravity separation techniques. Tungsten concentrates obtained by these methods generally contain, by weight, between about 10% and about 70% tungsten ($WO_3$), sulfides in an amount up to about 10%, generally between about 0.2% and about 1%, silica in amounts between about 2% and about 30%, calcite in amounts between about 10% and about 70%. The sulfides are present as pyrites, pyrrohtite, arsenopyrite and chalcopyrite. The scheelite and wolframite concentrates can typically contain between about 0.5% and about 1% flotation oils and most frequently, between about 0.1% and about 0.2%.

Scheelite concentrates are slurried with water in an autoclave to provide a slurry containing between about 10% and about 75% solids, by weight, and most advantageously between about 25% and about 50% solids. The slurry is heated to a temperature of at least about 230° C. under an oxygen partial pressure of at least about 25 psi atmospheres to oxidize substantially all the flotation oils associated with the tungsten concentrate.

An important aspect of the present invention is the temperature to which the slurry of water and tungsten-bearing material is heated. At temperatures below about 230° C., the temperature is too low to be effective in oxidizing the flotation reagents at commercially acceptable rates. The flotation reagents to not have to be completely oxidized to carbon dioxide and water but can be partially oxidized to shorter carbon chain products, such as acetic acid, which are compatible with digestion and downstream process requirements. The process in accordance with the present invention can be conducted at any temperature lower than the critical temperature of water. However, temperatures in excess of about 320° C. require the use of such heavy autoclaves that the process rapidly becomes uneconomic. Advantageously, from the viewpoint of substantially complete oxidation of flotation oils at commercially attractive rates, oxidation of the flotation oils is conducted at a temperature between about 250° C. and about 290° C.

Another important aspect of the present invention is the oxygen partial pressure over the slurry of the tungsten concentrate. Oxygen partial pressures below about 25 psi result in the incomplete oxidation of the flotation oils or any other organic materials oxidized with the concentrate and can also result in longer reaction times. Oxygen partial pressures in excess of about 800 psi can also be employed but again such high pressures require the use of extra heavy materials in construction of the autoclave thereby rendering the overall process less economically feasible. In order to insure substantially complete oxidation of the flotation oils and other organic matter associated with the tungsten concentrate at commercially attractive rates, oxygen partial pressures between about 100 psi and about 300 psi are employed. It will be recognized by those skilled in the art that under these conditions the total pressure in the autoclave will vary between about 400 psig and about 3,000 psig.

Mass transfer of oxygen from the gaseous phase to the aqueous phase and between the aqueous phase and the solids is facilitated by agitation of the heated slurry with conventional mixers in order to maintain the tungsten concentrate in suspension and to draw oxygen into the aqueous phase from the gaseous phase. Agitation is also effective in facilitating mass transfer of carbon dioxide from the aqueous phase thereby increasing the rate of oxidation by minimizing the concentration of one of the products of the reaction.

As noted hereinbefore the process in accordance with the present invention is also effective in oxidizing any sulfides contained in the ore or ore concentrate. The oxidation of such sulfides is advantageous in that the sulfide sulfur is not transferred with subsequent process operations. Although the oxidation of the sulfides can produce sulfuric acid which can consume reagents, such as sodium carbonate or sodium hydroxide, in subsequent processing of tungsten concentrates, this adverse effect can be minimized by employing sufficient additional amounts of the reagent to react with the sulfuric acid.

An advantageous feature of the present invention is that oxidation of the flotation reagent and sulfides generates heat which offsets external process heat requirements for maintaining the process temperatures. Indeed, this process could conceivably generate excess heat which can be utilized in subsequent operations or for the generation of power.

As noted hereinbefore an advantageous embodiment of the present invention is the oxidation of organic matter and sulfides associated with scheelite concentrates during digestion with sodium carbonate solutions. Processes for digesting scheelite concentrates as described in copending applications, Ser. Nos. 06/225,914, 06/225,913, and 06/225,910, all filed on even date herewith and all of which are incorporated herewith by reference. Also, wolframite concentrates can be treated in a like manner, except the wolframite is digested with sodium hydroxide. Mixtures of scheelite and wolframite can be treated as described in copending application, Ser. No. 06/225,906, filed on even date herewith and which is incorporated herewith by reference.

The invention provides an improved process for the soda ash ($Na_2CO_3$) digestion of low-grade scheelite concentrates, particularly low-grade scheelite concentrates containing about 2% to 40% $WO_3$, generally about 5% to 30% $WO_3$, e.g., about 10% to 20%. The process is based on the discovery of a surprising interaction between soda ash concentration, the $Na_2CO_3/WO_3$ weight ratio, the aqueous tungsten concentration in the pregnant liquor, and the temperature employed in the digestion of scheelite concentrates in aqueous soda ash solution.

The recognition of the interrelationships between the aforementioned four parameters has enabled the substantial reduction in the amount of soda ash required to attain the desired tungsten extraction, has minimized the excess soda ash in the pregnant liquor, and has provided maximum yield of the tungsten while minimizing dissolution of gangue minerals. The maintenance of a low quantity of soda ash in the autoclave discharge pregnant liquor is important in that as the quantity of soda ash discharged increases, so does th subsequent sulfuric acid demand, the volume of gas to be scrubbed during $MoS_3$ precipitation and also the amount of sodium sulfate in the solvent extraction raffinate.

One embodiment of the invention comprises forming a slurry of scheelite concentrate in an aqueous sodium carbonate solution of initial concentration ranging from about 50 gpl to 200 gpl (grams per liter) at a relatively low $Na_2CO_3/WO_3$ weight ratio of about 0.9 to 1.6 or higher and then digesting said slurry in an autoclave at an elevated temperature ranging from about 230° C. to 320° C., e.g., about 250° C. to about 290° C. under an oxygen partial pressure of at least about 25 psi. If the scheelite concentrate contains substantial amounts of sulfide minerals, greater amounts of sodium carbonate may have to be employed to insure high tungstate extraction because the sulfides upon oxidation produce sulfates which during digestion react with the sodium carbonate to form sodium sulfate thereby lowering the amount of sodium carbonate available for digesting tungsten values.

Improved process efficiency is obtained by employing the $Na_2CO_3$ concentration of the leach solution in substantially inverse relationship with the digestion temperature and in substantially direct relationship with the $Na_2CO_3/WO_3$ weight ratio, the relationship selected being such as to effect the consistent dissolution of at least about 95% of the $WO_3$ in the concentrate, preferably at least about 99%, and provide a pregnant liquor containing said $WO_3$.

It is preferred that the soda ash concentration range from about 75 gpl to 175 gpl and, more preferably, from about 75 gpl to 150 gpl. Likewise, the $Na_2CO_3/WO_3$ weight ratio may range from about 1 to 1.4.

Tests have shown that the higher the digestion temperatures, the less is the amount of soda ash needed to achieve high tungsten extraction and the greater is the $WO_3/Na_2CO_3$ ratio in the pregnant solution. It has been observed that the higher the initial concentration of $Na_2CO_3$, the higher the weight ratio of $Na_2CO_3/WO_3$ needed to obtain $WO_3$ extraction in excess of 95%, e.g., at least about 97% or 98%. By controlling the $Na_2CO_3/WO_3$ weight ratio, pregnant liquors containing up to about 130 or 140 gpl of $WO_3$ are obtainable.

At constant initial $Na_2CO_3$ concentration, it has been observed that increasing the $NaCO_3/WO_3$ weight ratio increases the percent $WO_3$ extracted to a certain minimum, and that further increases in $Na_2CO_3$ decreases extraction.

It has further been observed that increasing the aqueous tungsten concentration in the pregnant liquor without a corresponding increase in $Na_2CO_3$ concentration can sharply decrease $WO_3$ extraction. However, the inhibiting effect of high tungsten concentration decreases as temperature is increased.

The improved process is particularly applicable to the soda ash pressure digestion of difficult-to-leach low-grade scheelite concentrates containing by weight at least about 2% and preferably from about 5% to 30% $WO_3$. However, the invention is applicable to scheelite concentrates containing about 2% to 70% $WO_3$. Such concentrates generally contain at least about 2% silica and up to about 30% $CaCO_3$.

By controlling the digestion time and temperature, $Na_2CO_3$ concentration and the $Na_2CO_3:WO_3$ ratio, substantial dissolution of gangue can be inhibited at elevated temperatures.

Generally, increased temperature can result in substantially increased gangue material dissolution. However, this effect is minimal in the soda ash process of the invention due to the decreased $Na_2CO_3$ requirements at higher reaction temperatures. Less $Na_2CO_3$ means less alkalinity, which limits attack of concentrate gangue constituents. The autoclave discharge liquor's pH is about 11.1 at 180° C., 10.7 at 200° C., and 10.5 at 230° C., due to the lower amounts of $Na_2CO_3$ at the higher temperatures. For consistent combination of optimum results, the $Na_2CO_3/WO_3$ ratio is advantageously controlled at about 0.9:1 to 1.6:1, preferably about 1:1 to 1.4:1.

The concentration of $Na_2WO_4$ attained in the pregnant liquor during digestion is important in providing high dissolution yields. The primary digestion reaction involved both $Na_2CO_3$ and $Na_2WO_4$ and is reversible. By increasing the $Na_2CO_3$ to $Na_2WO_4$ weight ratio, extraction is increased. Conversely, decreasing this ratio or increasing the amount of $Na_2WO_4$ in the pregnant liquor will have a negative effect on the extraction efficiency.

Thus, to assure consistently high dissolution yields, the tungsten concentration constraints can be minimized by leaching to not more than about 100 gpl $WO_3$, e.g., about 75 to 95 gpl, and, more preferably, over the range of approximately 90 to 95 gpl $WO_3$.

When tungsten ore or low-grade tungsten concentrate is digested, the pregnant liquor containing the sodium tungstate is further treated following filtration to remove such impurities as molybdenum. Any excess sodium carbonate is neutralized with acid and the pH adjusted to that value required to effect precipitation of Mo as $MoS_3$ using sulfide ion as the precipitate. It is important that the $WO_3$/Mo ratio in the purified solution be very high, for example, 20,000/1. To achieve this, the discharge pregnant solution is advantageously at least about 100 gpl $WO_3$.

One method to achieve the foregoing requirements is to leach to a final $WO_3$ concentration of less than 100 gpl, for example, to a range of about 75 to 95 gpl, more preferably, approximately 90 to 95 gpl, to obtain a high dissolution yield and then subject the discharge pregnant liquor to flash down to evaporate sufficient solution to increase the concentration of $WO_3$ in the pregnant liquor at least 10% and preferably at least about 15 or 20% of the original concentration to increase the $WO_3$ concentration to upwards of about 120 to 140 gpl.

In production, fine grinding of the ore or concentrate can increase the amount of tungsten that is solubilized under a given leach condition, although fine grinding can increase substantially the amount of the water in the filter cake. Concentrates having a particle size of minus 150 mesh can be treated. Preferably, the bulk of the material should be minus 325 mesh, with at least about 25% minus 400 mesh.

In order to provide those skilled in the art with a better understanding of the present invention, the following illustrative examples are given:

EXAMPLE I

This example demonstrates the effects of temperature and oxygen partial pressure during the digestion of scheelite concentrates which are characterized in Table I. The samples of the concentrates were slurried with water containing initially 150 gpl $Na_2CO_3$ with the $Na_2CO_3$:$WO_3$ ratio being 1.2 to 1. The slurry was fed to a two liter Parr titanium autoclave. A single 5.8-cm diameter, 6-bladed axial flow radial turbine impeller located 2.5 cm off the reactor bottom was used to agitate the slurry. Heat was provided by an electric heating mantle. A run was begun by adding a charge of concentrate to the reactor along with enough sodium carbonate solution to give the desired carbonate concentration and a slurry concentration of the desired percent solids. The slurry was agitated at 600 rpm. The slurry was then heated to the reaction temperature under the oxygen partial pressure specified in Table II. After reaching the reaction temperature shown in Table II, additional oxygen was introduced into the autoclave (if necessary) to bring the total pressure to the steam pressure plus the desired oxygen overpressure. At the end of the test the autoclave was discharged and the slurry was filtered to obtain a pregnant liquor that was analyzed for total organic carbon (TOC) and $WO_3$. The solids were washed several times with the washings combined for $WO_3$ analysis along with the wash residue to determine tungsten extraction.

To test the filtrate from foaming, a 150 ml of filtrate was poured into a 500 ml graduate cylinder. An air sparger was then inserted to the bottom of the filter and the height of the foam generated in two minutes was measured for a standard air flow. The foaming tests were conducted at ambient temperatures and the results are reported in Table II.

Reference to Table II confirms that temperatures below 250° C. are ineffective in successfully reducing the total organic carbon with the result that those tests conducted at temperatures below 250° C. provided a filtrate which displaced substantial foaming. Reference to Table II also confirms that high oxygen partial pressures are more effective in lowering the total organic carbon content of the filtrates and in reducing the amount of foaming the filtrate displaced upon air sparging. Reference to tests 16 through 19 also demonstrates that concentrates containing significant amounts of sulfides lower the tungsten extraction by reacting with the sodium carbonate to form sodium sulfate. With concentrates containing such high sulfide concentrations, tungsten recovery can be improved by using greater amounts of sodium carbonate.

TABLE I

| Sample Number | Type | % S | % $WO_3$ |
|---|---|---|---|
| 50365 | Flotation | 0.2 | 15.0 |
| 50332 | Flotation | — | 23.4 |
| 50662 g | Gravity | 3.34 | 35.6 |

TABLE II

| Test No. | Concentrate Used | Temp., °C. | Time, Hrs. | $O_2$ Pressure Psi | Total Pressure Psig | Filtrate Foam, ml | TOC, ppm | % $WO_3$ Extn. |
|---|---|---|---|---|---|---|---|---|
| 1 | 50332 | 230 | 2 | 0 | 390 | 330 | 198 | 99.7 |
| 2 | 50332 | 230 | 2 | 240 | 630 | 240 | 289 | 99.7 |
| 3 | 50332 | 250 | 2 | 120 | 700 | 90 | 225 | 99.9 |
| 4 | 50332 | 250 | 2 | 240 | 820 | 75 | 170 | 99.8 |
| 5 | 50332 | 250 | 2 | 360 | 940 | 40 | 208 | 99.9 |
| 6 | 50332 | 250 | 4 | 240 | 820 | 0 | 135 | 99.8 |
| 7 | 50332 | 250 | 7 | 240 | 820 | 0 | 105 | 99.8 |
| 8 | 50332 | 270 | 2 | 240 | 1040 | 0 | 69 | 99.8 |
| 9 | 50332 | 290 | 2 | 240 | 1310 | 0 | 40 | 99.5 |
| 10 | 50365 | 230 | 2 | 0 | 390 | 375 | 505 | 99.7 |
| 11 | 50365 | 230 | 2 | 240 | 630 | 245 | 770 | 98.1 |
| 12 | 50365 | 250 | 2 | 240 | 820 | 80 | 375 | 98.8 |

TABLE II-continued

| Test No. | Concentrate Used | Temp., °C. | Time, Hrs. | $O_2$ Pressure Psi | Total Pressure Psig | Filtrate Foam, ml | TOC, ppm | % $WO_3$ Extn. |
|---|---|---|---|---|---|---|---|---|
| 13 | 50365 | 270 | 2 | 240 | 1040 | 0 | 145 | 99.6 |
| 14 | 50365 | 290 | 2 | 240 | 1310 | 0 | 40 | 99.5 |
| 15 | 50662g | 230 | 2 | 0 | 390 | 80 | 20 | 99.3 |
| 16 | 50662g | 230 | 2 | 240 | 630 | 0 | 64 | 86.2 |
| 17 | 50662g | 250 | 2 | 240 | 820 | 0 | 23 | 90.7 |
| 18 | 50662g | 270 | 2 | 240 | 1040 | 0 | 63 | 96.9 |
| 19 | 50662g | 290 | 2 | 240 | 1310 | 0 | 11 | 95.9 |

Although the present invention has been described in conjunction with the preferred embodiments, it is to be understood that modifications and variations thereto may be resorted to without departing from the spirit and scope of the invention as those skilled in the art will readily understand. Such modifications and variations are considered to be within the purview and scope of the invention and the appended claims.

We claim:

1. A process for digesting scheelite concentrates containing organic matter, which comprises establishing a slurry of a sodium carbonate solution having sodium carbonate concentration between about 50 gpl and about 200 gpl and a scheelite concentrate in an amount to provide a $Na_2CO_3/WO_3$ weight ratio of between about 0.9 to about 1.6, and heating the slurry to a temperature between about 230° C. and about 320° C. under an oxygen partial pressure of at least about 25 psi to digest the scheelite concentrate forming a pregnant sodium tungstate solution and to oxidize the organic matter.

2. The process as described in claim 1 wherein the scheelite concentrate contains sulfide minerals and the sulfide sulfur is oxidized to sulfuric acid.

3. The process as described in claim 2 wherein the slurry is heated to a temperature between about 250° C. and about 290° C.

4. The process as described in claim 2 wherein the oxygen partial pressure is between about 100 psi and about 300 psi.

5. The process as described in claim 4 wherein the slurry is agitated to facilitate mass transfer of oxygen from a gaseous phase to the slurry.

6. The process as described in claim 5 wherein the scheelite concentrate contains between about 2% and about 70% $WO_3$.

7. A process for digesting wolframite concentrates containing organic matter which comprises establishing a slurry of a sodium hydroxide solution and a wolframite concentrate and heating the slurry to a temperature between about 230° C. and about 320° C. under an an oxygen partial pressure of at least about 25 psi to digest the wolframite concentrate forming a pregnant sodium tungstate solution and to oxidize the organic matter.

8. The process as described in claim 7 wherein the slurry is heated to a temperature between about 250° C. and about 290° C.

9. The process as described in claim 8 wherein the oxygen partial pressure is between about 100 psi and about 300 psi.

10. The process as described in claim 9 wherein the slurry is agitated to facilitate mass transfer of oxygen to the slurry.

* * * * *